W. J. LENNON.
TEST PLUG.
APPLICATION FILED OCT. 24, 1912.
1,059,053.
Patented Apr. 15, 1913.
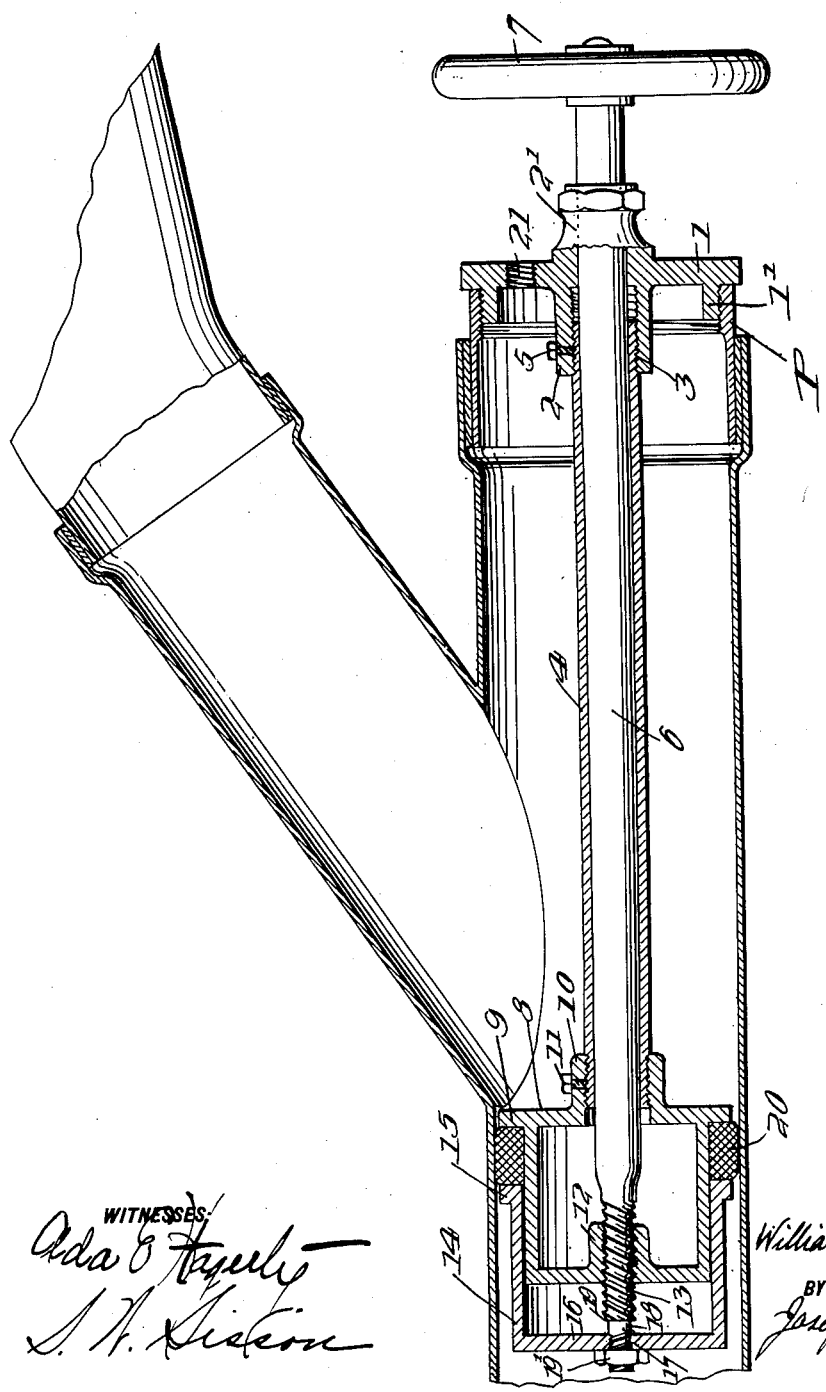

UNITED STATES PATENT OFFICE.

WILLIAM J. LENNON, OF CENTRAL FALLS, RHODE ISLAND.

TEST-PLUG.

1,059,053. Specification of Letters Patent. Patented Apr. 15, 1913.

Application filed October 24, 1912. Serial No. 727,476.

*To all whom it may concern:*

Be it known that I, WILLIAM J. LENNON, a subject of the King of Great Britain, residing at Central Falls, in the county of Providence and State of Rhode Island, have invented a new and useful Improvement in Test-Plugs, of which the following is a specification.

This invention relates to certain new and useful improvements in test plugs and relates more particularly to test plugs used in connection with sewerage systems to allow the latter to be given a water test to ascertain whether all of the joints have been properly made and whether any leakage is present.

The object of the invention is to provide an improved test plug of novel, simplified and economical construction, which can be quickly and readily applied in position and removed.

In the drawings: the figure is a sectional view of the invention, showing the same applied in position ready for use.

The invention consists of a cap 1 having a peripherally threaded flange 1', the cap at its center being formed with a nut 2 and stuffing box 2', the nut being provided with a threaded opening 3 in which one end of a pipe 4 is screwed and held rigidly by a set screw 5. An operating rod 6 passes through the pipe 4 and the stuffing box and has a hand wheel 7 on its outer end. A stationary member 8 has an annular flange 9 which latter has an internally threaded boss 10 screwed onto the inner end of the pipe 4 and rigidly secured to the latter by a set screw 11. Member 8 has an interiorly threaded boss 12 which engages with the threads 13 on the operating rod.

Mounted to freely slide over the member 8 is a hollow member 14 which has an annular flange 15 and a closed end 16 the latter being perforated at 17 to receive the reduced end 18 of the rod 6. A shoulder 19 is formed by the reduced end portion 18 to abut the end 16 of member 14, the extremity of end portion 18 being threaded and receiving a nut 19' which forms an abutment to engage the outer face of the closed end 16 of the member 14.

Suitable packing 20 which may be composed of oakum or rag lamp wicking is positioned to surround member 8 and is disposed between the flange 9 of member 8 and flange 15 of member 14.

In operation, the clean out cap is removed from the clean out plug P which latter has been properly leaded in position. The test plug is then inserted through the clean out plug P and the cap 1 is screwed into position in the plug P, after which the hand wheel 7 is rotated to cause the member 14 to compress the packing making a tight joint and preventing leakage. The cap 1 which has a threaded water inlet 21 is then connected to any suitable source of water supply and the water allowed to flow into the system to its highest point, after which the joints are examined to determine any leakage.

Having thus described my invention, I claim as new and desire to secure by Letters Patent:—

1. In a test plug, a cap having a nut and a stuffing box, a pipe having one end threaded into engagement with the nut, a member having a threaded boss and a flanged end rigidly secured to the opposite end of the pipe, an operating rod passed through the pipe having a hand wheel on one end and having its other end threaded into said boss, a hollow member slidingly mounted on the first named member having an annular flange and a closed end formed with an opening, the inner end of said rod being reduced in diameter and passed through said opening, said reduced end of the rod forming a shoulder which abuts one face of said closed end, a nut on said reduced end of the rod which abuts the other face of the closed end, and packing between the flanges, said cap having an inlet to enable water to be supplied therethrough.

2. In a test plug, a cap having a threaded portion for engagement with the threads of a pipe in a sewerage system to close said pipe, said cap having an opening to enable water to be supplied therethrough, a packing carrying member, a pipe rigidly connected at its ends to said cap and member, an operating rod passed loosely through the pipe and having connection with said member, and means connected to the rod for engagement with the packing to compress the latter when the rod is operated.

3. In a test plug, a cap having a threaded portion for engagement with the threads of a pipe in a sewerage system to close said pipe, said cap having an opening to enable water to be supplied therethrough, said cap also having an interiorly threaded nut, a pipe having one end threaded into said nut and rigidly secured to the latter, a member having a flanged portion and an interiorly threaded boss, the other end of said pipe being threaded into said boss and rigidly secured thereto, a flanged member slidingly mounted on the first named member, an operating rod extending through the pipe and having a threaded inner end, the first named member having a threaded boss which receives said threaded rod end, the outer end of said rod being loosely connected to the outer end of the second named member.

4. In a test plug, a cap having a water inlet, a flanged packing carrying member, a pipe rigidly connected at its ends to the said cap and member, a member slidingly mounted on the first named member and having a flange to engage the packing, an operating rod passed loosely through the pipe and having threaded engagement with the packing carrying member and loose connection with the second named member.

In testimony whereof I have signed my name to this specification in the presence of two subscribing witnesses.

WILLIAM J. LENNON.

Witnesses:
ADA E. HAGERTY,
J. A. MILLER.